United States Patent
Bouzegzi et al.

(10) Patent No.: US 8,509,331 B2
(45) Date of Patent: Aug. 13, 2013

(54) METHOD FOR THE BLIND ESTIMATION OF OFDM MODULATION PARAMETERS ACCORDING TO A MAXIMUM LIKELIHOOD CRITERION

(75) Inventors: Abdelaziz Bouzegzi, Grenoble (FR); Pierre Jallon, Grenoble (FR); Philippe Ciblat, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 212 days.

(21) Appl. No.: 13/062,672

(22) PCT Filed: Sep. 14, 2009

(86) PCT No.: PCT/EP2009/061873
§ 371 (c)(1),
(2), (4) Date: Jul. 12, 2011

(87) PCT Pub. No.: WO2010/029172
PCT Pub. Date: Mar. 18, 2010

(65) Prior Publication Data
US 2011/0293026 A1    Dec. 1, 2011

(30) Foreign Application Priority Data

Sep. 15, 2008 (FR) .................................... 08 56195

(51) Int. Cl.
*H04K 1/10* (2006.01)
(52) U.S. Cl.
USPC ........................................ 375/260; 375/259
(58) Field of Classification Search
USPC ................................................ 375/259, 260
See application file for complete search history.

(56) References Cited

U.S. PATENT DOCUMENTS

| 2005/0047515 A1* | 3/2005 | Walton et al. ................. 375/267 |
| 2009/0268782 A1* | 10/2009 | Wang et al. .................... 375/130 |
| 2011/0090980 A1* | 4/2011 | Okino ............................ 375/267 |

OTHER PUBLICATIONS

Liu, Peng; Li, Bing-bing; Lu, Zhao-yang; Gong, Feng-kui; A Blind Time—parameters Estimation Scheme for OFDM in Multi-path Channel, IEEE, 2005, p. 222-227.

Jaume Riba et al.: "Conditional Maximum Likelihood Timing Recovery: Estimators and Bounds", IEEE Transactions on Signal Processing, IEEE Service Center, New York, NY, vol. 49, No. 4, Apr. 1, 2001.

Rey et al.: "Joint Synchronization and Symbol Detection in Asynchronous DS-CDMA systems", Statistical Signal and Array Processing, 2000, Proceedings of the Tent H IEEE Workshop on Aug. 14-16, 2000, Piscataway, NJ, IEEE Aug. 14, 2000, pp. 687-691.

Pantos: "A Numerical Technique for Blind Estimation of Carrier Frequency Offset in OFDM Systems", IEEE Transactions on Broadcasting, IEEE Service Center, Piscataway, NJ, vol. 52, No. 4, Dec. 1, 2006, pp. 566-569.

(Continued)

Primary Examiner — Emmanuel Bayard
(74) Attorney, Agent, or Firm — Knobbe Martens Olson & Bear LLP (57) ABSTRACT

The present invention relates to a method for blind estimation of at least one parameter of an OFDM signal according to a maximum likelihood (ML) criterion. In one embodiment, the estimation method uses a deterministic maximum likelihood criterion. In another embodiment, the estimation method assumes that the modulation symbols modulating the subcarriers of the OFDM multiplex are i.i.d. and Gaussian random variables. The estimation of said parameter is carried out while minimizing a cost function depending on the chosen criterion.

8 Claims, 4 Drawing Sheets

(56) References Cited

OTHER PUBLICATIONS

Yucek et al.: "A Novel Sub-Optimum Maximum-Likelihood Modulation Classification Algorithm for Adaptive OFDM Systems", Wireless Communications and Networking Conference, 2004, WCNC, 2004 IEEE Atlanta, GA, Mar. 21-25, 2004, Piscataway, NJ, IEEE vol. 2, Mar. 21, 2004, pp. 739-744.

Bouzegzi et al: "A fourth-order algorithm for blind characterization of OFDM signals"; Signal Processing Advances in Wireless Communications, 2008, SPAWC 2008, IEEE $9^{th}$ Workshop, IEEE, Piscataway, NJ, Jul. 6, 2008, pp. 411-415.

Vasquez et al: "Optimal Quadratic NDA Synchronization", $7^{th}$ International ESA Conference, Oct. 1, 2001, pp. 1-10.

Acmouche et al.: "OFDM parameters estimation a time approach", Signals, Systems and Computers, 2000, Conference Record of the Thirty-Fourth Asilomar Conference on Oct. 29-Nov. 1, 2000, Piscataway, NJ, IEEE vol. 1, Oct. 29, 2000, pp. 142-146.

International Search Report and Written Opinion dated Oct. 20, 2009 for PCT Application No. PCT/EP2009/061873.

\* cited by examiner

METHOD FOR THE BLIND ESTIMATION OF OFDM MODULATION PARAMETERS ACCORDING TO A MAXIMUM LIKELIHOOD CRITERION

TECHNICAL FIELD

The present invention relates to a method for the blind estimation of OFDM (Orthogonal Frequency Division Multiplex) modulation parameters.

BACKGROUND OF THE INVENTION

OFDM modulation is well known from the prior art and is used in many telecommunications systems, such as DVB-T, ADSL, Wi-Fi (IEEE 802 a/g), WiMax (IEEE 802.16). It has the advantage of good spectral responsivity and good protection from selective frequency fading.

It will be recalled that in an OFDM system, the information symbols to be transmitted are grouped by blocks of N symbols, where N is generally a power of 2, the OFDM symbols being obtained by performing an IFFT (Inverse Fast Fourier Transform) on said blocks of information symbols. Generally, a cyclicprefix is added to the beginning of each OFDM signal to absorb the inter-symbol interference (ISI) and facilitate equalization upon reception. The OFDM signal formed by these OFDM symbols may possibly be translated in frequency.

Generally, the signal transmitted by an OFDM system can be represented in baseband by:

$$s_a(t) = \frac{\sqrt{E}}{N} \sum_k g(t-k(N+D)T_c) \cdot \sum_{n=0}^{N-1} a_{k,n} e^{-2i\pi \frac{n}{NT_c}(t-DT_c-k(N+D)T_c)} \quad (1)$$

where E is the power of the signal, N is the number of carriers of the OFDM multiplex, $a_{k,n}$ are the information symbols of the block k, belonging to a modulation alphabet M-ary, typically BPSK, QPSK or QAM, $1/T_c$ is the throughput of the information symbols where $T_c$ is the "chip" time, D is the size of the cyclic prefix expressed in number of chips, g(t) is a forming impulsion for the OFDM signals having a temporal support $[0,(N+D)T_c]$ intended to apodize the spectrum of the signal.

Figure 1:
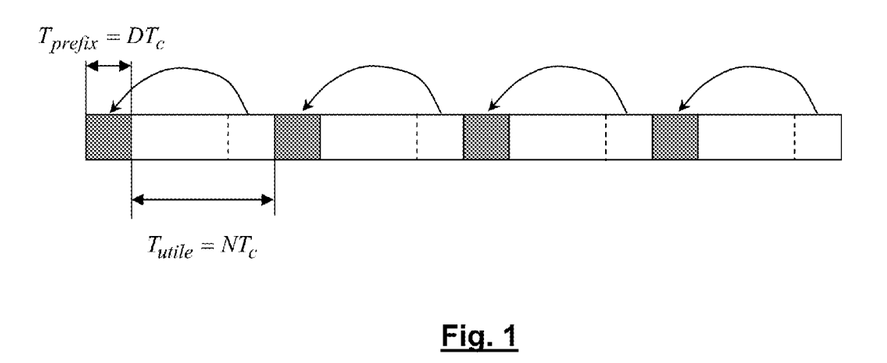
FIG. 1 diagrammatically illustrates an OFDM signal.

We have diagrammatically illustrated an OFDM signal in FIG. 1. It is made up of a sequence of OFDM symbols, each symbol having a total duration $(N+D)T_c$ including a useful duration $NT_c$ and a guard interval $T_{prefix}=DT_c$, in which the cyclic prefix is located. It will be recalled that, traditionally, the cyclic prefix is a copy of the end of the OFDM symbol inside the guard interval. In certain OFDM systems, the cyclic prefixes are simply omitted, in other words the useful portions of the symbols are separated by "empty" guard intervals. This transmission technique also makes it possible to eliminate inter-symbol interference, but does not make equalization of the signal easy.

After propagation in the transmission channel, the OFDM signal received by the receiver can be expressed by:

$$y(t)=h \otimes s_a(t)+b(t) \quad (2)$$

where $h \otimes s_a$ is the convolution between the OFDM signal transmitted, $s_a(t)$ is the impulse response from the transmission channel h(t), and b(t) is a random function describing the noise. It will be assumed that the length of the impulse response is shorter than the length of the guard interval, so that it will be possible to neglect the inter-symbol interference (ISI).

Figure 2:
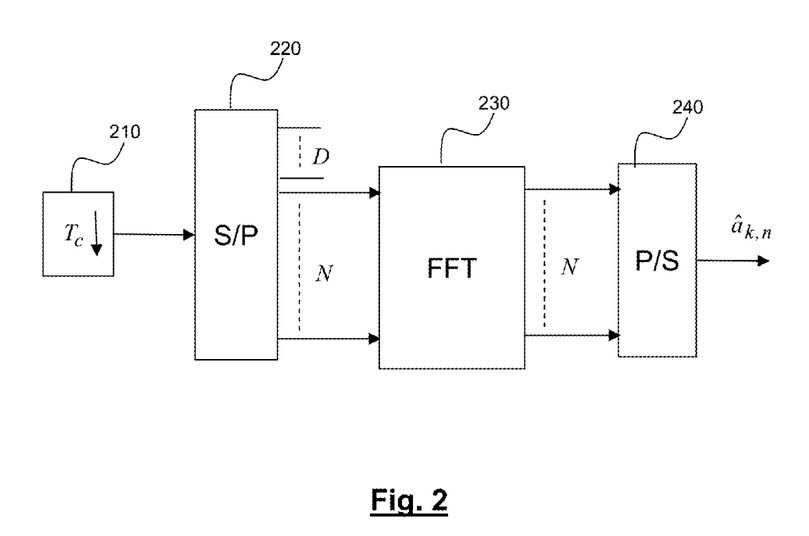
FIG. 2 diagrammatically illustrates an OFDM receiver known from the prior art.

FIG. 2 diagrammatically illustrates the structure of an OFDM receiver.

After any baseband demodulation, the received signal is sampled at 210 at the chip frequency, then the samples are subjected to a serial/parallel conversion at 220 to form blocks of N+D samples. The first D samples corresponding to the guard interval are rejected and the block of the N remaining samples corresponding to the useful portion of the OFDM symbol is subjected to a FFT at 230. The demodulated symbols obtained are then subjected to a serial conversion at 240.

Eventually, assuming that the receiver is well synchronized in time and frequency, the demodulated symbols can be expressed by:

$$\hat{a}_{k,n}=h_n a_{k,n}+b_{k,n} \quad (3)$$

where $h_n$ is a complex coefficient that depends on the impulse response of the transmission channel, and $b_{k,n}$ is a random variable representing a noise sample.

The proper operation of this receiver requires precise synchronization in time and frequency. Indeed, it is understood that a poor time synchronization will cause gradual temporal slipping of the truncation window, and a poor frequency synchronization will cause a phase rotation of the samples, which can be represented by a multiplicative factor $e^{2i\pi\Delta f n T_c}$, where $\Delta f$ is the frequency offset between the demodulation frequency of the receiver and the carrier frequency of the OFDM multiplex.

The temporal and frequency synchronization of the receiver is generally done owing to the acquisition of a learning sequence.

The operation of this detector assumes, of course, that the parameters of the transmitted OFDM signal are known (in other words, the parameters of the OFDM symbols). "Parameters of the OFDM signal" refers here to the number N of sub-carriers, the useful duration $NT_c$ of a symbol or, equivalently, the frequency spacing $1/NT_c$ between sub-carriers, the duration of the guard interval $DT_c$ and/or the repetition period $(N+D)T_c$ of said symbols.

Quite often, the receiver does not know a priori the parameters of the OFDM signal and it is necessary to estimate them blindly, before any demodulation.

Several methods have been proposed to that end. They exploit the presence of the cyclic prefix in the OFDM signal and the resulting cyclostationarity properties. The estimators for the parameters are based on the auto-correlation function of the OFDM signal. An example of such an estimating method can be found in the article by P. Liu et al. entitled "A blind time-parameters estimation scheme for OFDM in multi-path channel", published in Proc. 2005 Int'l Conference on Information, Communications and Signal Processing, vol. 1, pp. 242-247, 23-26 Sep. 2005.

These estimating methods, however, have the drawback of requiring the acquisition of a large number of OFDM symbols to calculate the auto-correlation function. Moreover, these methods do not work in the case, mentioned above, where the OFDM signal does not have cyclic prefixes. They do not work well or at all when the ratio between the prefix duration and the OFDM symbol duration, D/(D+N), is low. Indeed, in this case, the secondary peak of the auto-correlation function, due to the cyclostationarity of the signal, becomes blurred or even disappears in the noise. It is then impossible to precisely determine the gap between the main peak and the secondary peak that makes it possible to estimate the parameter $NT_c$.

The aim of the present invention is therefore to propose a method for the blind estimation of parameters of an OFDM signal that does not have the aforementioned drawbacks.

A secondary aim of the present invention is to allow temporal and frequency synchronization of the OFDM receiver that is fast and does not require a learning sequence.

BRIEF DESCRIPTION OF THE INVENTION

The present invention is defined, according to a first embodiment, by a method for blind estimation of at least one parameter of an OFDM signal comprising a plurality of OFDM symbols, wherein the OFDM signal is baseband sampled for a given observation period to obtain a plurality of samples and in that one calculates, for a plurality of values of said parameter and a block of modulation symbols of a modulation constellation, a cost function depending on a distance between a vector y made up of the plurality of samples and a vector $H_\theta a$ where a is made up of the symbols of said block and $H_\theta$ is a matrix representing the modulation of the sub-carriers of the OFDM multiplex by said modulation symbols, said matrix depending on the parameter to be estimated, said cost function being averaged for each value of the parameter on a set of blocks of possible symbols to obtain an averaged value of the cost function, the estimation of the parameter being obtained as the value of the parameter corresponding to the lowest averaged value.

According to one example, the parameter(s) of the OFDM signal is (are) the number of sub-carriers of that signal and/or the duration of the prefix of an OFDM symbol and/or the useful duration of an OFDM symbol.

According to a second embodiment, the invention also relates to a method for the blind estimation of at least one parameter of an OFDM signal comprising a plurality of OFDM symbols, characterized in that the OFDM signal is baseband sampled for a given observation period to obtain a plurality M of samples and in that one calculates, for a plurality of values of said parameter, a cost function depending on a distance between a vector y made up of said plurality of samples and a vector $H_\theta H_\theta^\dagger y$ where $H_\theta$ is a matrix representing the modulation of the sub-carriers of the OFDM multiplex by a block of modulation symbols, said matrix depending on the parameter to be estimated, and where $H_\theta^\dagger y$ is the pseudo-inverse matrix of $H_\theta$, the estimation of the parameter being obtained as the value of the parameter corresponding to the lowest value of the cost function on said plurality of values of the parameter.

Advantageously, the pseudo-inverse matrix $H_\theta^\dagger y$ is calculated as $$\frac{H_\theta^H}{q(1+D/N)}$$

where $H_\theta^H$, q is the conjugated transpose of the matrix $H_\theta$, q is a test value of the sampling rate of the OFDM signal, D and N are respectively a prefix length test value and a useful length test value expressed in number of chips.

A third embodiment of the invention concerns a method for the blind estimation of at least one parameter $\theta$ of an OFDM signal comprising a plurality of OFDM symbols, characterized in that the OFDM signal is baseband sampled for a given observation period to obtain a plurality of samples and in that one calculates, for a plurality of values of said parameter, a cost function $\Omega$, decreasing function of the Gaussian conditional probability $p_g(y|\theta)$, where y is a vector made up of said plurality of samples and $p_g(y|\theta)$ is obtained from a guassian distribution of the modulation symbols modulating the various sub-carriers of the OFDM multiplex for said plurality of OFDM symbols, the estimation of the parameter being obtained as the value of the parameter corresponding to the lowest value of the cost function on said plurality of values of the parameter.

Advantageously, said cost function is a function of $-\log p_g(y|\theta)$.

According to a first example, said cost function can be calculated using the expression:

$$\Omega(-\log p_g(y|\theta)) = \det(2\sigma_a^2 H_\theta^H H_\theta + 2N_0 I_{KN}) - \frac{\sigma_a^2}{2N_0} y^H H_\theta (\sigma_a^2 H_\theta^H H_\theta + N_0 I_{KN})^{-1} H_\theta^H y$$

where $H_\theta$ is a matrix representing the modulation of the sub-carriers of the OFDM multiplex by said modulation symbols, said matrix depending on the parameter to be estimated, $H_\theta^H$ is the conjugated transpose of the matrix $H_\theta$, $I_{KN}$ is the unit matrix, $\sigma_a^2$ is an estimation of the variance of the modulation symbols, $N_0$ is an estimation of the noise density, and det(.) is the determinant.

According to a second example, the cost function is obtained from the expression:

$$\Omega(-\log p_g(y|\theta)) = KN\log(\omega_a^2) - \frac{\sigma_a^2}{N_0 \omega_a^2} y^H H_\theta H_\theta^H y$$

where $$\omega_a^2 = 2\sigma_a^2 q\left(1 + \frac{D}{N}\right) + 2N_0$$

where $H_\theta$ is a matrix representing the modulation of the sub-carriers of an OFDM multiplex by said modulation symbols, said matrix depending on the parameter to be estimated, $H_\theta^H$ is the conjugated transpose of the matrix $H_\theta$, $I_{KN}$ is the unit matrix, $\sigma_a^2$ is an estimate of the variance of the modulation symbols, $N_0$ is the noise density, q is a test value of the sampling rate of the OFDM signal, D and N are respectively a prefix length test value and a useful length test value expressed in number of chips.

BRIEF DESCRIPTION OF THE DRAWINGS

Other features and advantages of the invention will appear upon reading one preferred embodiment of the invention done in reference to the appended figures, in which.

DETAILED DESCRIPTION OF THE INVENTION

Below we will consider the case of a telecommunications system using an OFDM modulation. We will consider that the OFDM signal transmitted has the form given by expression (1) and that the OFDM symbols may or may not contain a prefix. For simplification, we will consider that they contain a prefix, but that it can be empty (D=0).

We will situate ourselves in the context of a blind estimation of at least one parameter of the OFDM signal, in particular an OFDM modulation parameter, such as the number of sub-carriers, the frequency spacing between these sub-carriers or, equivalently, the useful duration of the OFDM symbols. The set of parameters to be estimated is represented by a vector θ, for example θ=(N,DT$_c$,NT$_c$). In certain cases, this assembly can be reduced to a singleton. For example, the number N of carriers and the duration of the OFDM symbol T$_s$=(N+D)T$_c$ can be known, the parameter to be blindly estimated being the useful duration NT$_c$.

The signal received by the receiver can be expressed, after baseband demodulation and sampling at a frequency $1/T_e$ greater than the Nyquist frequency $1/T_c$, by:

$$y(m) = \sum_{l=0}^{L} \lambda_l s_a(m - \tau_l) + b(m) \quad (4)$$

where the $\lambda_l$ and $\tau_l$ are respectively the complex attenuation coefficients and the delays associated with the different paths of the channel expressed in numbers of samples, L is the total number of paths, and $b(m)=b(mT_e)$ where b(t) is an additive white Gaussian noise.

Without loss of generality, but for the sake of simplification, we will hereinafter limit ourselves to the case of a single path channel. In that case, it can be shown that equation (4) can be put in matricial form:

$$y=H_\theta a+b \quad (5)$$

where $y=(y(0), y(1), \ldots, y(M-1))^T$, $(.)^T$ represents the transposition operation, $M=\lfloor T_0/T_e \rfloor$ where $T_0$ is the length of the observation window of the OFDM signal, and $\lfloor x \rfloor$ is the largest integer less than or equal to x, $a_k=(a_{k,0}, a_{k,1}, \ldots, a_{k,M-1})^T$ and $a=a_0^T, a_1^T, \ldots, a_{k-1}^T)^T$ with $K=\lceil T_0/T_s \rceil$ and $\lceil x \rceil$ is the smallest integer greater than or equal to x, $b=b(0), b(1), \ldots, b(M-1))^T$. In other words, y is the size vector M made up of samples received in baseband, a is a size vector KN representative of the sequence of the KN modulation symbols a modulating the sub-carriers n=0, ..., N-1 of the OFDM symbols k=0, ..., K-1 in the observation window, and b is the vector made up of the noise samples.

Generally, the matrix $H_\theta$ is representative of the channel and the OFDM modulation, this modulation being parameterized by a set θ of parameters, for example θ is the triplet θ=(N, DT$_c$/NT$_c$). We will use the case of a flat fading channel. The matrix $H_\theta$ is then only representative of the OFDM modulation. More precisely, if the forming function g(t) can be approximated by a window function, the elements of the matrix $H_\theta$ are null except for those defined to within a multiplicative factor by:

$$H_\theta(m, k_m N + n) = \frac{1}{\sqrt{N}} e^{2i\pi nm \frac{T_e}{NT_c}} e^{2i\pi n(k_m+1)\frac{DT_c}{NT_c}} \quad (6)$$

where m=0, ..., M-1, n=0, ..., N-1 and where $k_m$ is the only integer verifying:

$$m\frac{T_e}{(N+D)T_c} - 1 < k_m \leq m\frac{T_e}{(N+D)T_c} \quad (7)$$

Generally, it is proposed according to the invention to look for the values of the parameters $\hat{\theta}$ of the OFDM signal according to a maximum likelihood (ML) criterion. According to that criterion, one looks for $\hat{\theta}$ that maximizes the conditional probability p(y|θ), i.e. the conditional probability p(y|θ,a) taken as an average over the values of a:

$$p(y|\theta)=E_a(p(y|\theta,a)) \quad (8)$$

The components of the noise vector b being assumed to be independent, identically distributed and Gaussian, this amounts to looking for $\hat{\theta}$ that minimizes the quadratic distance between the vector of the received signal y and the vector $H_\theta a$, $H_\theta$ being a matrix representative of the transfer function of the channel and the parameters θ of the OFDM signal, as for example yielded by (6), the distance being taken as an average value over the vector of the modulation symbols a, i.e.:

$$\hat{\theta} = \underset{\theta}{\operatorname{argmin}} E_a(\|y - H_\theta a\|^2) \quad (9)$$

and more generally:

$$\hat{\theta} = \underset{\theta}{\operatorname{argmin}} E_a(\Omega(\|y - H_\theta a\|)) \quad (9')$$

where Ω is a cost function that increases with the distance $\|y-H_\theta a\|$.

According to a first embodiment of the invention, the estimation of the parameters of the OFDM signal is done from expressions (9) or (9'). This estimation can for example be done using a Monte Carlo-type method when the receiver knows the law of probability of the symbols $a_{k,n}$.

According to a second embodiment of the invention, the estimation of the parameters of the OFDM signal, $\hat{\theta}$, can be simplified by considering that the vector a is made up of deterministic symbols. In other words, the maximum likelihood criterion thus simplified, also called deterministic maximum likelihood (DML) criterion, does not take the probability distribution of a into account, but uses a first estimation of a:

$$\hat{a}_0 = H_{\theta_0}^\dagger y \quad (10)$$

where $\theta_0$ is an arbitrary value, preferably chosen in the order of magnitude of the actual value, $H_{\theta_0}^\dagger=(H_{\theta_0}^H H_{\theta_0})^{-1} H_{\theta_0}^H$ is the pseudo-inverse matrix of $H_{\theta_0}$.

The estimated values of the OFDM signal parameters, synthetically denoted in the form of a vector $\hat{\theta}$, for example $\hat{\theta}=(\hat{N}, \hat{D}T_c, \hat{N} T_c)$ are then determined using:

$$\hat{\theta} = \underset{\theta}{\operatorname{argmax}} p(y | \theta, a = \hat{a}_0) \quad (11)$$

If one assumes that the components of b are decorrelated and correspond to a white noise, hypothesis verified in practice if the sampling frequency $1/T_e$ is high enough relative to the Nyquist frequency $1/T_c$, the expression (11) can be written equivalently:

$$\hat{\theta} = \underset{\theta}{\operatorname{argmin}}(\|y - H_\theta \hat{a}_0\|^2) \quad (12)$$

or, by replacing $\hat{a}_0$ with its expression (10):

$$\hat{\theta} = \underset{\theta}{\operatorname{argmin}}(\|(I_M - H_\theta(H_{\theta_0}^H H_{\theta_0})^{-1} H_{\theta_0}^H) y\|^2) \quad (13)$$

and, more generally:

$$\hat{\theta} = \underset{\theta}{\operatorname{argmin}}(\Omega(\|(I_M - H_\theta(H_{\theta_0}^H H_{\theta_0})^{-1} H_{\theta_0}^H) y\|)) \quad (13')$$

where $\Omega$ is a cost function that increases with the distance $\|(I_M - H_\theta(H_{\theta_0}^H H_{\theta_0})^{-1} H_{\theta_0}^H) y\|$ It can be shown that if $T_0$ is a whole multiple of $T_s$, in other words if the length of the observation window is a whole multiple of the OFDM symbol time, the matrix $H_{\theta_0}^H H_{\theta_0}$ then reduces to:

$$H_{\theta_0}^H H_{\theta_0} = q\left(1 + \frac{D}{N}\right) I_{KN} \quad (14)$$

and therefore the pseudo-inverse matrix $H_{\theta_0}^\dagger$:

$$H_{\theta_0}^\dagger = \frac{H_{\theta_0}^H}{q(1 + D/N)} \quad (14')$$

where $q = T_e/T_c$ is the sampling rate of the OFDM signal used for the test values of the parameters $\theta_0$ and $I_{KN}$ is the unit matrix with size $KN \times KN$.

In practice, expression (14) is a satisfactory approximation of $H_{\theta_0}^H H_{\theta_0}$, even if the length of the observation window is not a whole multiple of the duration of an OFDM symbol. In the context of this approximation, the criterion (13') is simplified as follows:

$$\hat{\theta} = \underset{\theta}{\operatorname{argmin}}\left(\Omega\left(\left\|\left(I_M - \frac{H_\theta H_{\theta_0}^H}{q(1 + D/N)}\right) y\right\|\right)\right) \quad (15)$$

where $\Omega$ is the aforementioned cost function. The values q,D,N appearing in the right portion of the expression (15) depend on the test values of the parameters $\theta_0$.

It should be noted that the process of estimating the set of parameters $\theta$ can be iterated to improve the precision thereof. Indeed, the estimated value $\hat{\theta}$ given by (13), (13') or (15) can then be used as a new test value $\theta_1 = \hat{\theta}$, in other words this first estimation of the parameters of the OFDM signal can be used to calculate a second matrix $H_{\theta_1}$, for example using expression (6), and a second estimation $\hat{\theta}_{(2)}$ from (13), (13') or (15) in which the matrix $H_{\theta_0}$ has been replaced by the matrix $H_{\theta_1}$. This second estimation can be used again as test value, and so on.

The preceding iterative method works well if the test value is close to the actual value of the parameters. It can, however, lead to an erroneous estimation in the case where $\theta_0$ is too far from the actual parameters, for example if the number of carriers, the prefix length and the useful length of the OFDM symbol, taken as test values, are too far from the actual values of the parameters of the OFDM signal. In that case, the estimation method may or may not converge towards a local minimum of the cost function.

In order to resolve this drawback, an alternative of the estimation method according to the second embodiment of the invention consists of using a "closed" expression of the distance appearing in (13), (13') and (15), or respectively:

$$\hat{\theta} = \underset{\theta}{\operatorname{argmin}}(\|(I_M - H_\theta(H_\theta^H H_\theta)^{-1} H_\theta^H) y\|^2) = \underset{\theta}{\operatorname{argmin}}(\|(I_M - H_\theta H_\theta^\dagger) y\|^2) \quad (16)$$

$$\hat{\theta} = \underset{\theta}{\operatorname{argmin}}(\Omega(\|(I_M - H_\theta H_\theta^\dagger) y\|)) \quad (16')$$

$$\hat{\theta} = \underset{\theta}{\operatorname{argmin}}\left(\Omega\left(\left\|\left(I_M - \frac{H_\theta H_\theta^H}{q(1 + D/N)}\right) y\right\|\right)\right) \quad (17)$$

Figure 3:
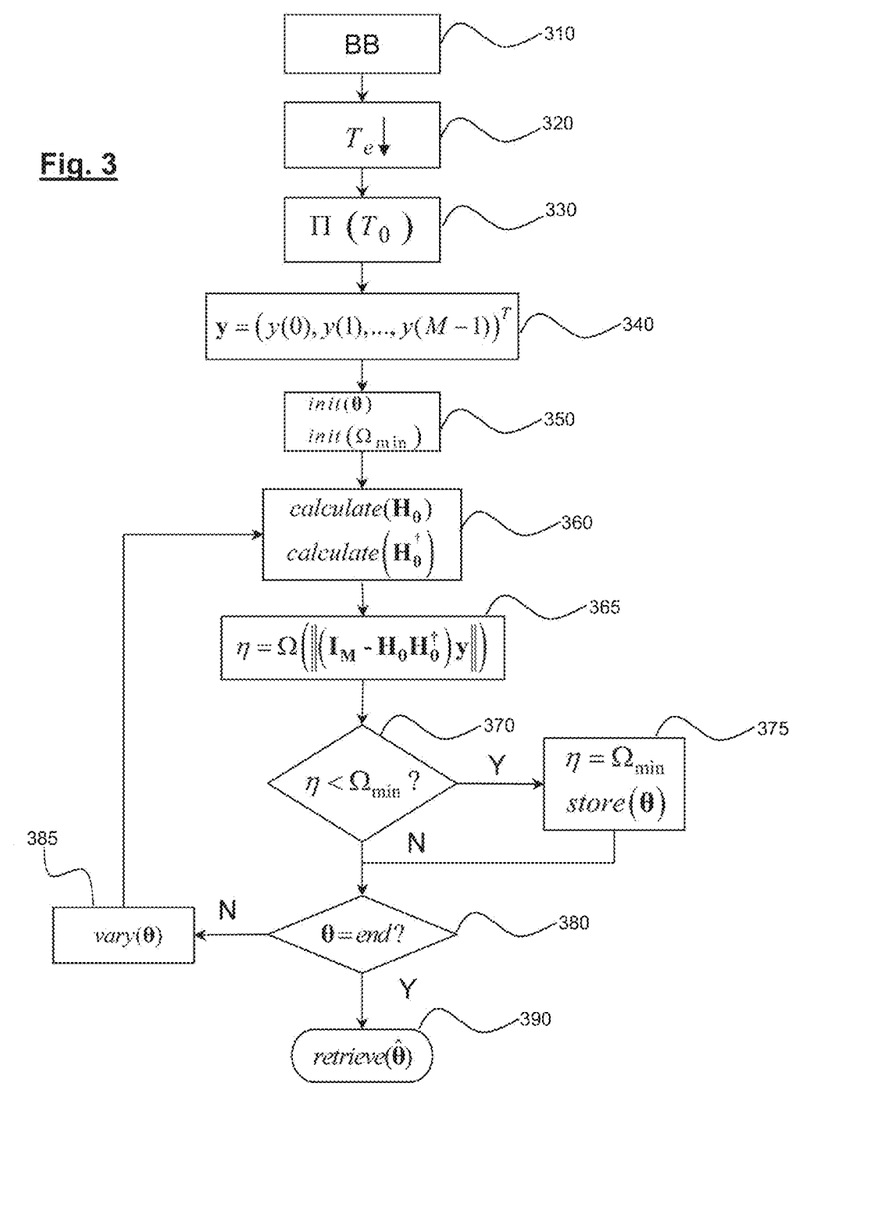
FIG. 3 is a flowchart of the method for estimating parameters of an OFDM signal according to a first embodiment of the invention.

FIG. 3 illustrates a method for blind estimation of an OFDM signal parameter according to said alternative of the second embodiment of the invention.

In step 310, the OFDM signal is baseband demodulated, then sampled at 320 at a frequency $1/T_e$ greater than the Nyquist frequency. The order of magnitude of $1/T_c$ is generally known, in other words the bandwidth of the OFDM signal, which makes it possible to choose the sampling frequency accordingly.

In step 330, a block of M complex samples is chosen corresponding to an observation window with a given width $T_0$. If the duration $T_s$ of the OFDM symbol is known, this width is advantageously chosen as a multiple of $T_s$.

In 340, the vector y is built from M complex samples, in 350 the values of the parameters of $\theta$ are initialized, as well as the minimum of the cost function at a high value $\Omega_{min}$, then one enters an iterative loop that goes through a range of values of said parameters.

At each iteration, in 360 one calculates the matrix $H_\theta$ and depending on the case, the pseudo-inverse matrix $H_\theta^\dagger$ (expressions 16, 16') or the matrix $H_\theta H_\theta^H$ (expression 17) then, in 365, the value $\eta$ taken from the function by the cost function $\Omega$, for the current vector $\theta$.

In 370, one tests whether this value is below $\Omega_{min}$. If it is, $\Omega_{min}$, is updated by $\eta$ in 375 and the corresponding values of the parameters $\theta$ are stored in memory. One then tests, in 380, whether the range of parameters has been completely gone through. If it has, one exits in 390. If not, the parameters of $\theta$ are modified in 385 and one returns to the calculation step 360. The values of the estimated parameters, $\hat{\theta}$, are retrieved from the memory.

The estimation method according to the second embodiment as described above has, as will be seen later, a lower error rate than the estimation method through auto-correlation known from the prior art.

An estimation method according to a third embodiment is, however, preferred for low signal-to-noise ratios.

This method assumes that the modulation symbols $a_{k,n}$ can be likened to independent complex random variables, identically distributed, circular, symmetrical and Gaussian. It will be recalled that a complex random variable is circular, symmetrical and Gaussian if its real and imaginary components are independent Gaussian variables with the same variance.

In that case, the vector y defined by (5) is itself a vectorial, circular, symmetrical, Gaussian random variable, with covariance matrix:

$$E(yy^H) = 2\sigma_a^2 H_\theta H_\theta^H + 2N_0 I_M \qquad (18)$$

The conditional probability density of y relative to θ in the Gaussian hypothesis, also called Gaussian conditional probability and denoted $p_g(y|\theta)$, can then be expressed as follows:

$$p(y|\theta) = \qquad (19)$$
$$\frac{1}{(2\pi)^M \det(2\sigma_a^2 H_\theta H_\theta^H + 2N_0 I_M)} \exp -\frac{1}{2} y^H (\sigma_a^2 H_\theta H_\theta^H + N_0 I_M)^{-1} y$$

The given probability distribution (19) differs from the actual distribution inasmuch as the modulation symbols generally belong to a constellation of points. In practice, however, that modeling is satisfactory subject to a correct choice of the variance $\sigma_u^2$.

Moreover, if I is the unit matrix with a given size and A is any matrix with the same size, we have the following properties:

$$\det(I + AA^H) = \det(I + A^H A) \text{ and} \qquad (20)$$

$$(I + AA^H)^{-1} = I - A(I + A^H A)^{-1} A^H \qquad (21)$$

Given properties (20) and (21), the Gaussian conditional probability density (19) can be reformulated, to within a multiplicative coefficient:

$$p_g(y|\theta) \propto \frac{1}{\det(2\sigma_a^2 H_\theta^H H_\theta + 2N_0 I_{KN})} \qquad (22)$$
$$\exp\left(\frac{\sigma_a^2}{2N_0} y^H H_\theta (\sigma_a^2 H_\theta^H H_\theta + N_0 I_{KN})^{-1} H_\theta^H y\right)$$

Looking for the maximum of the Gaussian conditional probability $p_g(y|\theta)$ amounts to looking for the minimum of $-\log p_g(y|\theta)$. The vector of the parameters of the OFDM signal that corresponds to the likelihood maximum is then given by:

$$\hat{\theta} = \underset{\theta}{\operatorname{argmin}}(\Omega(-\log p_g(y|\theta))) \qquad (23)$$

where Ω is a cost function that increases with $-\log p_g(y|\theta)$.

According to (22), an example of a cost function leading to the likelihood maximum, in the Gaussian hypothesis, can be written:

$$\Omega(-\log p_g(y|\theta)) = \qquad (24)$$
$$\det(2\sigma_a^2 H_\theta^H H_\theta + 2N_0 I_{KN}) - \frac{\sigma_a^2}{2N_0} y^H H_\theta (\sigma_a^2 H_\theta^H H_\theta + N_0 I_{KN})^{-1} H_\theta^H y$$

As in the second embodiment, when the length of the observation window is a whole multiple of the duration of an OFDM symbol, and more generally when the approximation (14) is valid, the cost function (24) can take the simplified form:

$$\Omega(-\log p_g(y|\theta)) = KN\log(\omega_a^2) - \frac{\sigma_a^2}{N_0 \omega_a^2} y^H H_\theta H_\theta^H y \qquad (25)$$

with $$\omega_a^2 = 2\sigma_a^2 q\left(1 + \frac{D}{N}\right) + 2N_0. \qquad (26)$$

The calculation of the cost function according to (24) or (25) requires that the values of $N_0$ and $\sigma_a$ be known. The noise level, $N_0$, may be estimated either through knowledge of the noise temperature in the band, or by measurements done in the absence of a signal. The signal level $\sigma_a$ may be estimated by measuring the power level in the band of interest, equal to $N_0 + \sigma_a^2$.

Figure 4:
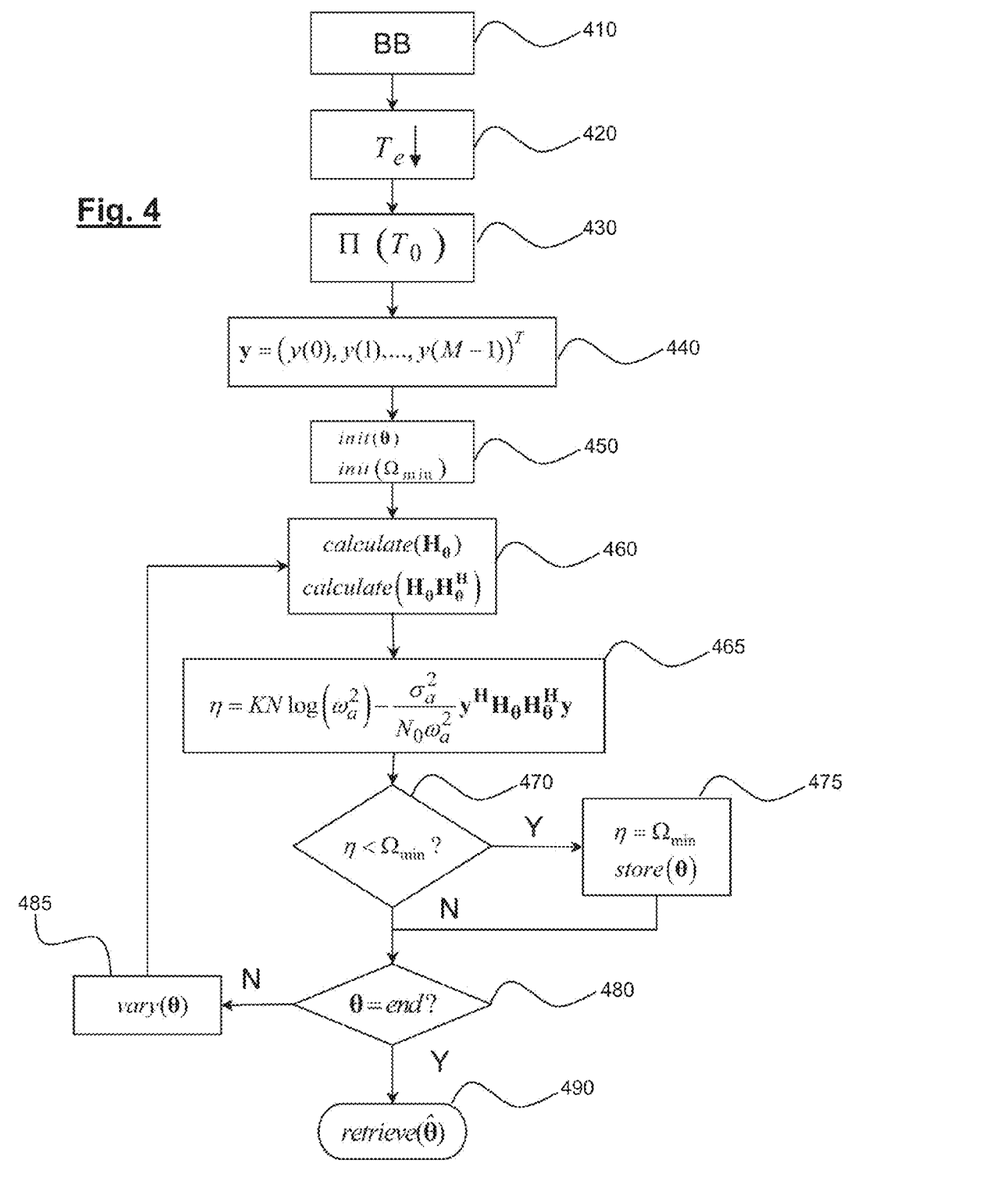
FIG. 4 is a flowchart of the method for estimating parameters of an OFDM signal according to a second embodiment of the invention.

FIG. 4 diagrammatically illustrates a method for the blind estimation of an OFDM signal parameter according to a second embodiment of the invention.

Steps 410 to 450 are identical to steps 310 to 350, respectively, and therefore will not be described again.

Upon each iteration of the loop, one calculates, in 460, the matrix $H_\theta$, then the matrix $H_\theta H_\theta^H$. The value of η is then deduced therefrom taken from the function by the cost function Ω, for the current vector θ, according to expression (24) or (25). In the illustrated example, expression (25) has been used.

In 470, one tests whether this value is less than $\Omega_{min}$. If it is, $\Omega_{min}$ is up dated by η in 475 and the corresponding values of the parameters θ are stored in memory. One then tests, in 480, whether the range of parameters has been completely gone through. If it has, one exits in 490. If not, one modifies the parameters of θ in 485 and returns to the calculation step 460. The values of the estimated parameters, $\hat{\theta}$, are the values present in the memory.

Figure 5:
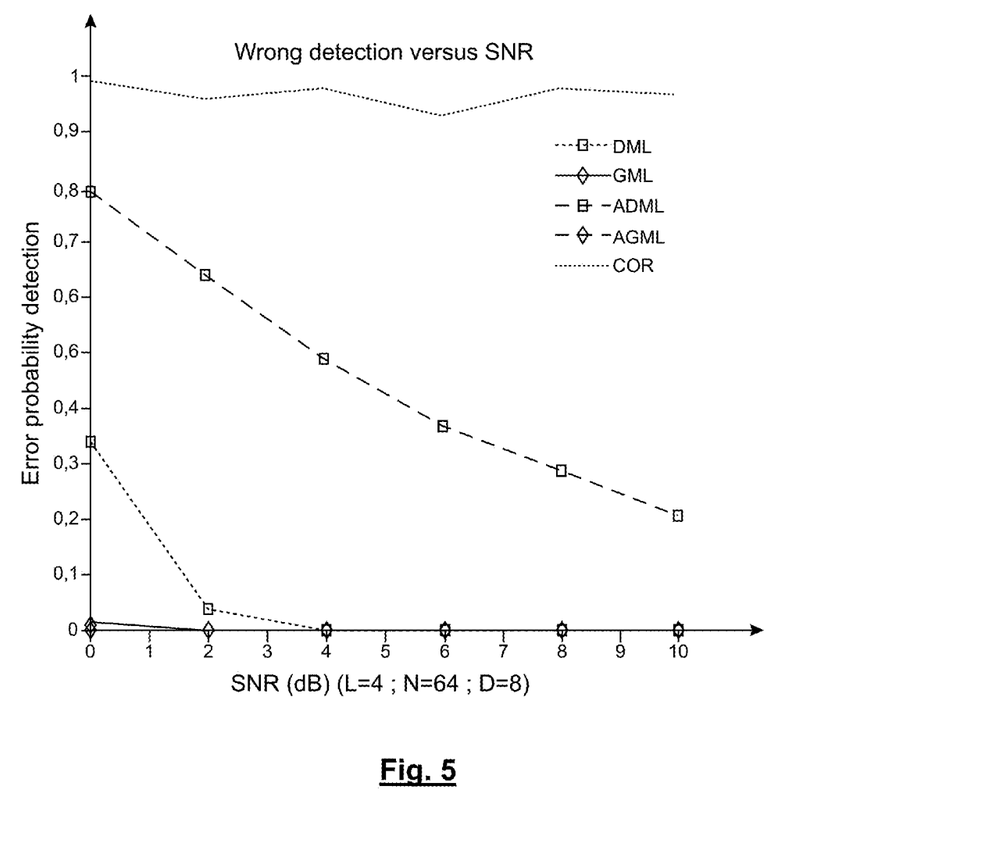
FIG. 5 shows the relative performance of different methods of estimating parameters of an OFDM signal, according to the invention and according to the prior art.

FIG. 5 shows the estimation error rate of an OFDM signal parameter, here the OFDM symbol duration $NT_c$ as a function of the signal-to-noise ratio.

The curve designated by COR is that obtained using the estimation method based on the auto-correlation method of the OFDM signal, as known from the prior art.

The curve designated by DML is that based on the estimation method according to the alternative of the second embodiment of the invention (expression (16)), that designated by ADML pertaining to the simplified version (expression (17)).

The curve designated by GML is that based on the estimation method according to the third embodiment of the invention (expression (24)), that designated by AGML pertaining to the simplified version (expression (25)).

It can be seen that regardless of the signal-to-noise ratio level, the estimation methods DML, GML as well as the simplified versions thereof ADML and AGML, are higher performing than that of the prior art.

Moreover, the GML and AGML methods yield a more reliable estimation than the DML and ADML methods, in particular for low signal-to-noise ratios. One may therefore consider opting for one or the other method according to the signal-to-noise ratio or the processing time.

The invention claimed is:

1. A method of blind estimation of at least one modulation parameter (θ) of an OFDM signal comprising a plurality of OFDM symbols, the method comprising:
baseband sampling the OFDM signal for a given observation period ($T_0$) to obtain a plurality of samples;
calculating, for a plurality of values of the parameter and a block of modulation symbols ($a_{k,n}$) of a modulation constellation, a cost function (Ω) depending on a distance between a vector y made up of the plurality of samples and a vector $H_\theta a$, wherein a comprises the symbols of the block and $H_\theta$ comprises a matrix representing the modulation of the sub-carriers of the OFDM multiplex by the modulation symbols, the matrix depending on the parameter to be estimated; and averaging the cost function for each value of the parameter on a set of blocks of possible symbols to obtain an averaged value $(E_a(\Omega(\|y-H_\theta a\|)))$ of the cost function, the estimation of the parameter being obtained as the value of the parameter ($\hat\theta$) corresponding to the lowest averaged value $$\left(\hat\theta = \mathrm{argmin}_\theta E_a(\Omega(\|y - H_\theta a\|))\right).$$

2. The method according to claim 1, wherein the modulation parameter(s) of the OFDM signal is (are) the number (N) of sub-carriers of that signal and/or the duration of the prefix ($DT_c$) of an OFDM symbol and/or the useful duration ($NT_c$) of an OFDM symbol.

3. A method of blind estimation of at least one modulation parameter (θ) of an OFDM signal comprising a plurality of OFDM symbols, the method comprising:

baseband sampling the OFDM signal for a given observation period ($T_0$) to obtain a plurality M of samples;

calculating, for a plurality of values of the parameter, a cost function (Ω) depending on a distance between a vector y made up of the plurality of samples and a vector $H_\theta H_\theta^\dagger y$ wherein $H_\theta$ comprises a matrix representing the modulation of the sub-carriers of the OFDM multiplex by a block of modulation symbols, the matrix depending on the parameter to be estimated, and wherein $H_\theta^\dagger$ comprises the pseudo-inverse matrix of $H_\theta$; and estimating the parameter being obtained as the value of the parameter ($\hat\theta$) corresponding to the lowest value of the cost function of the plurality of values of the parameter $$\left(\hat\theta = \mathrm{argmin}_\theta E_a(\Omega(\|y - H_\theta a\|))\right).$$

4. The estimation method according to claim 3, wherein the pseudo-inverse matrix $H_\theta^\dagger$ is calculated as $$\frac{H_\theta^H}{q(1+D/N)}$$

wherein $H_\theta^H$ comprises the conjugated transpose of the matrix $H_\theta$, q comprises a test value of the sampling rate of the OFDM signal, D and N are respectively a prefix length test value and a useful length test value expressed in number of chips ($T_c$).

5. A method for of blind estimation of at least one modulation parameter θ of an OFDM signal comprising a plurality of OFDM symbols, the method comprising:

baseband sampling the OFDM signal for a given observation period ($T_0$) to obtain a plurality of samples;

calculating, for a plurality of values of the parameter, a cost function Ω, a decreasing function of the Gaussian conditional probability $p_g(y|\theta)$, where y comprises a vector made up of the plurality of samples and $p_g(y|\theta)$ is obtained from a Gaussian distribution of the modulation symbols modulating the various sub-carriers of the OFDM multiplex for the plurality of OFDM symbols; and estimating the parameter being obtained as the value of the parameter ($\hat\theta$) corresponding to the lowest value of the cost function on the plurality of values of the parameter.

6. The method according to claim 5, wherein the cost function is a function of $-\log p_g(y|\theta)$.

7. The estimation method according to claim 6, wherein the cost function can be calculated using the expression:

$$\Omega(-\log p_g(y|\theta)) = \det(2\sigma_a^2 H_\theta^H H_\theta + 2N_0 I_{KN}) - \frac{\sigma_a^2}{2N_0} y^H H_\theta (\sigma_a^2 H_\theta^H H_\theta + N_0 I_{KN})^{-1} H_\theta^H y$$

where $H_\theta$ comprises a matrix representing the modulation of the sub-carriers of the OFDM multiplex by the modulation symbols, the matrix depending on the parameter to be estimated, $H_\theta^H$ comprises the conjugated transpose of the matrix $H_\theta$, $I_{KN}$ comprises the unit matrix, $\sigma_a^2$ comprises an estimation of the variance of the modulation symbols, $N_0$ comprises an estimation of the noise density, and det(.) comprises a determinant.

8. The method according to claim 6, wherein the cost function is obtained from the expression:

$$\Omega(-\log p_g(y|\theta)) = KN\log(\omega_a^2) - \frac{\sigma_a^2}{N_0 \omega_a^2} y^H H_\theta H_\theta^H y$$

where $$\omega_a^2 = 2\sigma_a^2 q\left(1 + \frac{D}{N}\right) + 2N_0$$

where $H_\theta$ comprises a matrix representing the modulation of the sub-carriers of an OFDM multiplex by the modulation symbols, the matrix depending on the parameter to be estimated, $H_\theta^H$ comprises the conjugated transpose of the matrix $H_\theta$, $I_{KN}$ is comprises the unit matrix, $\sigma_a^2$ comprises an estimate of the variance of the modulation symbols, $N_0$ comprises the noise density, q comprises a test value of the sampling rate of the OFDM signal, D and N are respectively a prefix length test value and a useful length test value expressed in number of chips ($T_c$).

* * * * *

UNITED STATES PATENT AND TRADEMARK OFFICE
CERTIFICATE OF CORRECTION

PATENT NO. : 8,509,331 B2
APPLICATION NO. : 13/062672
DATED : August 13, 2013
INVENTOR(S) : Bouzegzi et al.

It is certified that error appears in the above-identified patent and that said Letters Patent is hereby corrected as shown below:

In the Specification

In column 2 at line 28, Change "$e^{2i\pi \Delta fnT_c},$" to --$e^{2i\pi \Delta fnT_c}$--.

In column 3 at line 48, Change "$H_\theta^\dagger y$" to --$H_\theta^\dagger$--.

In column 4 at line 1, Change "guassian" to --Gaussian--.

In column 5 at lines 44-45, Change "b=b(0)," to --b=(b(0),--.

In column 5 at line 48, Change "a" to --$a_{k,n}$--.

In column 8 at line 47, Change "$\Omega_{min}$" to --$\Omega_{min}$.--.

In column 8 at line 48, Change "$\Omega_{min}$," to --$\Omega_{min}$--.

In column 10 at line 28, Change "up dated" to --updated--.

In the Claims

In column 11 at line 46, In Claim 4, Change "estimation method" to --method--.

In column 12 at line 1, In Claim 5, Change "for of" to --of--.

In column 12 at line 50, In Claim 8, Change "is comprises" to --comprises--.

Signed and Sealed this
First Day of April, 2014

Michelle K. Lee
*Deputy Director of the United States Patent and Trademark Office*